(12) United States Patent
Deringor et al.

(10) Patent No.: US 7,971,327 B2
(45) Date of Patent: Jul. 5, 2011

(54) PROCESS AND SYSTEM FOR SUB-DIVIDING A LAMINATED FLOORING SUBSTRATE

(75) Inventors: Gungor J. Deringor, Carneys Point, NJ (US); Sam Cantey Dryden, Jamestown, NC (US)

(73) Assignee: Mannington Mills, Inc., Salem, NJ (US)

( * ) Notice: Subject to any disclaimer, the term of this patent is extended or adjusted under 35 U.S.C. 154(b) by 1153 days.

(21) Appl. No.: 11/715,675

(22) Filed: Mar. 8, 2007

(65) Prior Publication Data

US 2007/0209736 A1 Sep. 13, 2007

Related U.S. Application Data

(60) Provisional application No. 60/781,238, filed on Mar. 10, 2006.

(51) Int. Cl.
*B23P 23/00* (2006.01)

(52) U.S. Cl. ......... 29/33 R; 29/558; 29/897.32; 83/371; 83/365; 83/39; 83/425.4; 144/376; 144/253.7; 144/357; 144/360; 144/379

(58) Field of Classification Search ............ 29/897, 29/897.3, 897.32, 557–558, 564, 33 R; 83/371, 83/365, 13, 39, 425.4; 144/376, 253.1, 253.7, 144/356–357, 360, 379; 409/138, 159, 161, 409/172, 173

See application file for complete search history.

(56) References Cited

U.S. PATENT DOCUMENTS

| | | | | |
|---|---|---|---|---|
| 208,323 | A * | 9/1878 | Mayo | 144/36 |
| 2,090,879 | A * | 8/1937 | Thornton | 144/218 |
| 3,407,690 | A * | 10/1968 | Stanley | 83/47 |
| 3,885,483 | A | 5/1975 | Ikeya et al. | |
| 4,819,528 | A * | 4/1989 | Chadwick | 83/13 |
| 6,189,196 | B1 * | 2/2001 | Weathers | 29/450 |
| 6,393,956 | B1 * | 5/2002 | Blum et al. | 83/498 |
| 6,569,272 | B2 | 5/2003 | Tychsen | |
| 7,168,352 | B2 * | 1/2007 | Su et al. | 83/13 |
| 2003/0005842 | A1 * | 1/2003 | Hirschmann et al. | 101/491 |

FOREIGN PATENT DOCUMENTS

| | | |
|---|---|---|
| DE | 202004018661 U1 * | 3/2005 |
| WO | WO 99/61212 | 12/1999 |
| WO | WO 2006/103565 A2 | 10/2006 |

OTHER PUBLICATIONS

International Search Report and Written Opinion for PCT/US2007/005770 dated Aug. 3, 2007 (15 pages).
"Laminate 2005 Lifestyle Guide," by Mannington, 2005 (25 pages).

* cited by examiner

*Primary Examiner* — Erica E Cadugan
(74) *Attorney, Agent, or Firm* — Kilyk & Bowersox, P.L.L.C.

(57) ABSTRACT

A process for sub-dividing a laminated flooring substrate into a plurality of laminated flooring planks and a system therefore are described. The process can include providing a laminated flooring substrate having a decorative pattern on a core wherein the decorative pattern can include a plurality of indicators, and independently detecting the indicators with a plurality of detecting devices, each assigned a respective indicator. The detecting devices can individually obtain the position of the detected indicators and a control unit can align a separate saw blade per each position detected. The system includes a cutting unit with individually adjustable saws or an alignment device configured to align the laminated flooring substrate with the saws, to cut the laminated flooring substrate along positions relative to the detected indicators, for example, in the center thereof or off-set therefrom.

17 Claims, 3 Drawing Sheets

Machine Direction (MD)

Alternative centering embodiment wherein the centering is based on the center of a bottom surface of the planks that does not have the decorative pattern

Fig. 5

PROCESS AND SYSTEM FOR SUB-DIVIDING A LAMINATED FLOORING SUBSTRATE

This application claims the benefit under 35 U.S.C. §119 (e) of prior U.S. Provisional Patent Application No. 60/781, 238, filed Mar. 10, 2006, which is incorporated in its entirety by reference herein.

INTRODUCTION

The present teachings relate to a process for sub-dividing a laminated flooring substrate into a plurality of laminated flooring planks and a system therefore. The present teachings can also relate to a process for sub-dividing a laminated flooring substrate which comprises a decorative pattern on a top surface of a core, into a plurality of laminated flooring planks, and a system therefore. Optionally, the present teachings relate to a process for centering a laminated flooring plank for cutting a tongue profile and groove profile and a system therefore.

Planks are employed in floorings. For example, planks are cut from a large laminated flooring substrate (panel) to make it easy for shipping and then the planks are later put together to cover a floor.

The laminated flooring substrate can be of a variety of materials, such as wood or plastic laminates. These laminated flooring substrates can comprise at least a core and a decorative pattern on a top surface of the core. The decorative pattern serves as a decorative feature of the flooring. Any decorative pattern can be used such as parquet, ceramic, stone, brick, marble, and wood grain patterns and the like. The decorative pattern can be printed on paper, the paper can be coated or saturated with a resin(s) or a polymer(s), and then applied onto the top surface of the core. The paper can be rolled onto the top surface of the core and a protective layer(s) can be created on top of the paper by a coating application(s). Heat and pressure can be used in this process. The protective layer can be called an overlay or the combined layer of resin, the protective layer, and the decorative pattern can be called an overlay pattern.

During the process of making the laminated flooring substrate comprising a decorative pattern, however, the above-described process or other processes of making the decorative pattern can dimensionally change the paper and therefore, the decorative pattern and/or the substrate with the decorative pattern. Therefore, when a laminated flooring substrate is cut into planks, the dimensional change should be taken into account or the resulting planks can have planks wherein the print pattern on each plank is not equal or uniform. In other words, and as an example, the print pattern simulating grout lines may not be substantially equal in width from plank to plank (or tile to tile), and thus, when the planks are connected together, the grout lines will be uneven. This dimensional change can be in the form of paper growth and the paper growth can be non-linear, especially in the non-machine direction.

In order to overcome this problem, manufacturers have manually adjusted the saw blades individually that are used to cut the laminated flooring substrate in order to adjust for growth in the print pattern. Unfortunately, this process is time consuming, subject to manual errors and therefore costly.

Mechanical and automated systems have been created in an attempt to overcome these problems. For example, a system, such as that described in U.S. Pat. No. 6,569,272, has been developed using two cameras to measure the width of the dimensionally changed decorative pattern, compare it with the width of the original undimensionally changed decorative pattern, and then make adjustments to the saw blades to cut the laminated flooring substrate into individual planks. This system, however, presumes that the decorative pattern is uniformly/linearly dimensionally changed. In other words, this system assures that the dimensional change or growth is completely linear across the width of the pattern. In actuality, the decorative pattern is usually non-uniformly/non-linearly dimensionally changed.

Another problem exists in the industry. Once the planks are cut, a tongue profile and groove profile are cut on the respective side edges of the planks. It is desirable to properly center the planks when the planks are cut to produce the tongue profile and the groove profile to promote a proper and uniform fitting when the panels are later connected together. Again, this can be accomplished manually and individually for each plank such that the process is time consuming and costly while being proned to errors.

Accordingly, there is a need to provide a process for sub-dividing a laminated flooring substrate into a plurality of laminated flooring planks and a system therefore that avoid one or more of the above-described disadvantages. There is also a need to provide a process for centering a laminated flooring plank in preparation for cutting a tongue profile and groove profile on the respective edges of the laminate flooring plank and a system therefore.

SUMMARY

A feature of the present teachings is to provide a process for sub-dividing a laminated flooring substrate which comprises a decorative pattern on a top surface of a core, into a plurality of laminated flooring planks.

Another feature of the present teachings is to provide a process for sub-dividing a laminated flooring substrate which comprises at least an overlay or protective layer and a decorative pattern on a top surface of a core, into a plurality of laminated flooring planks.

An embodiment of the present teachings is to provide a process for sub-dividing a laminated flooring substrate which comprises a decorative pattern that can be at least slightly dimensionally changed when present on a top surface of a core of the laminated flooring substrate.

Another embodiment of the present teachings is to provide a process for sub-dividing a laminated flooring substrate which comprises a decorative pattern that can be at least slightly dimensionally changed in a non-uniform/non-linear fashion and/or in a uniform/linear fashion, when the decorative pattern is present on a top surface of a core of the laminated flooring substrate.

Another embodiment of the present teachings is to provide a process for sub-dividing a laminated flooring substrate which comprises a decorative pattern that has been dimensionally changed in a non-uniform/non-linear fashion and/or in a uniform/linear fashion, when the decorative pattern is present on a top surface of a core of the laminated flooring substrate and taking into account the dimensional change when cutting the laminated flooring substrate into planks.

An embodiment of the present teachings is to provide a process for sub-dividing a laminated flooring substrate which comprises a decorative pattern, into a plurality of laminated flooring planks such that when the planks are connected together, grout lines or other simulated features can be present in proper places (e.g., in proper alignment) thereby creating an aesthetic effect.

Various embodiments of the present teachings are to provide a process for sub-dividing a laminated flooring substrate which comprises a decorative pattern, into a plurality of laminated flooring planks, wherein the process can be efficient, accurate, automated, less costly, and/or avoids manual errors.

Another embodiment of the present teachings is to provide a process for centering laminated flooring planks after they are cut from a laminated flooring substrate.

Still another embodiment of the present teachings is to provide a process for centering laminated flooring planks after they are cut from a laminated flooring substrate to produce a tongue profile and a groove profile on respective edges of the laminated flooring planks to promote a proper fitting when the planks are connected together. According to various embodiments, the process for centering the laminated flooring planks allows for centering of planks having different sizes or different widths.

Various embodiments of the present teachings are to provide a process for centering laminated flooring planks after they are cut from a laminated flooring substrate, that can: be efficient, be accurate, avoid manual errors, be automated and/or be less costly.

Another embodiment of the present teachings is to provide a system for carrying out the process for sub-dividing a laminated flooring substrate which comprises a decorative pattern on a top surface of a core, into a plurality of laminated flooring planks.

A further embodiment of the present teachings is to provide a system for carrying out the process for centering laminated flooring planks after they are cut from a laminated flooring substrate.

Additional features and advantages of the present teachings will be set forth, in part, in the description that follows, and, in part, will be apparent from the description, or may be learned by practice of the present teachings. The objectives and other advantages of the present teachings will be realized and attained by means of the elements and combinations particularly pointed out in the description and appended claims.

To achieve these and other advantages, and in accordance with the purposes of the present teachings, as embodied and broadly described herein, the present teachings relate to a system for sub-dividing a laminated flooring substrate which comprises a decorative pattern on a top surface of a core, into a plurality of laminated flooring planks and optionally, a system for centering laminated flooring planks after they are cut from a laminated flooring substrate.

The present teachings can further relate to a process for sub-dividing a laminated flooring substrate comprising a leading edge, a right edge, a left edge and a trailing edge on an upper surface of the laminated flooring substrate, into a plurality of laminated flooring planks, the process comprising:

providing a laminated flooring substrate comprising a decorative pattern on a top surface of a core, wherein the decorative pattern comprises a plurality of indicators, wherein the indicators comprise at least a left side indicator, a right side indicator, and at least two intermediate feature-position indicators between the left side indicator and the right side indicator;

detecting the positions of the plurality of indicators with a plurality of detecting devices, each detecting device assigned to a respective indicator;

aligning a plurality of saw blades, each with a respective position of a respective one of the detected positions; and cutting the laminated flooring substrate along lines positioned at or off-set from each detected position, to form a plurality of laminated flooring planks.

In an embodiment, the cutting comprises cutting the laminated flooring substrate along lines centered with each detected position, to form a plurality of laminated flooring planks.

In another embodiment, the cutting comprises cutting the laminated flooring substrate along lines off-set from the centers of each detected position, to form a plurality of laminated flooring planks.

Optionally, the plurality of detecting devices comprises a plurality of cameras. In an embodiment, the plurality of indicators comprises at least four feature-position indicators, and the detecting comprises detecting each indicator with a separate respective one of the plurality of cameras.

In an embodiment, the process further comprises providing at least one additional detecting device that is positioned upstream from the plurality of detecting devices with respect to the machine direction to detect a straight-square alignment of the laminated flooring substrate; and aligning the laminated flooring substrate to be straight-square prior to the cutting.

Optionally, the at least two intermediate feature-position indicators comprises at least four intermediate feature-position indicators and the detecting comprises detecting at least four positions of the at least four feature-position indicators, respectively.

Optionally, the process further comprises cutting the leading edge and the trailing edge of one or more of the plurality of laminated flooring planks to form one or more planks cut on four sides.

In another embodiment, the process further comprises centering one or more of the one or more planks cut on four sides and profiling at least one tongue on one of the four cut sides and at least one groove on at least one opposite side.

Optionally, the process of centering the laminated flooring planks can be accomplished by providing a transporting device as part of the centering device to transport the laminated flooring planks in a machine direction; providing a plurality of a pair of wheels as part of the centering device, wherein each wheel of a pair of wheels is in communication with the other wheel of the pair of wheels and each wheel of a pair of wheels is disposed opposite the other wheel of the pair of wheels; and guiding and centering the laminated flooring planks in the machine direction using the transporting device and the plurality of the pair of wheels.

As an option, the process of centering the laminated flooring planks further comprises providing one upstream pair of wheels and at least one downstream pair of wheels with respect to the machine direction as part of the plurality of pair of wheels in order to guide and center the laminated flooring planks cut on four sides in the machine direction.

Optionally, the process of centering the laminated flooring planks cut on four sides further comprises providing a larger distance between each wheel of the upstream pair of wheels as compared to the distance between each wheel of the at least one downstream pair of wheels in order to guide and center the laminated flooring planks in the machine direction. Also optionally, the at least one downstream pair of wheels comprises three pairs of wheels.

In an embodiment, the process of centering the laminated flooring planks comprises providing an initial distance between each wheel of the pair of wheels that is smaller than the width of the laminated flooring planks, wherein edges of the laminated flooring planks push out the pair of wheels equal distantly in order to guide and center the laminated flooring planks in the machine direction.

Optionally, a hydraulic system is provided to control the position of the plurality of the pair of wheels, wherein each wheel of a pair of wheels moves in the opposite direction and equal distance as when the other wheel of the pair of wheels moves.

In an embodiment, in the process of centering the laminated flooring planks, the centering is based on the center of the bottom surface that does not have the decorative pattern, of the laminated flooring planks.

According to various embodiments, the process of subdividing the laminated flooring substrate further comprises embossing a texture in register with the decorative pattern on the laminated flooring substrate, prior to cutting the laminated flooring substrate into a plurality of laminated flooring planks.

According to an embodiment, the embossing a texture in register comprises:

transporting the laminated flooring substrate to a pressing plate;

providing a plurality of detecting devices, each assigned to a respective indicator, to detect the positions of the indicators;

detecting the indicators and the determining the positions of the detected indicators; and aligning the pressing plate with said texture on plate according to the positions of the detected indicators to emboss a texture in register with the decorative pattern on the laminated flooring substrate.

The present teachings further relate to a system for subdividing a laminated flooring substrate comprising a decorative pattern on a top surface of a core wherein the decorative pattern comprises a plurality of indicators, including at least a left side indicator, a right side indicator, and at least two feature-position indicators between the left side indicator and the right side indicator, into a plurality of laminated flooring planks, the system comprising:

a transporting device configured to transport in a machine direction the laminated flooring substrate;

a plurality of detecting devices, each assigned to a respective indicator, to detect the positions of the detected indicators;

a plurality of saw blades, each positionable relative to a respective position of a respective one of the detected indicators; and an aligning device configured to align a separate saw blade per each position or off-set per each position of the detected indicator to cut the laminated flooring substrate to form a plurality of laminated flooring planks.

Optionally, the system further comprises:

at least one additional detecting device that is positioned upstream from one of the detecting devices with respect to the machine direction and is configured to detect a straight-square alignment of the laminated flooring substrate; and a device configured to align the laminated flooring substrate to be straight-square prior to the cutting.

Optionally, at least one saw blade is configured to cut the laminated flooring substrate along lines centered with each detected position, to form a plurality of laminated flooring planks. Optionally, at least one saw blade is configured to cut the laminated flooring substrate along lines off-set from the centers of each detected position, to form a plurality of laminated flooring planks.

According to various embodiments, the plurality of detecting device comprises a plurality of cameras.

According to various embodiments, the plurality of indicators comprises at least four feature-position indicators, and the detecting comprises detecting each indicator with a separate respective one of the plurality of cameras.

Optionally, the system further comprises:

at least one additional saw blade located between two saw blades that are positioned by respective detecting devices;

a device configured to determine a distance between the two positioned saw blades and to determine a middle position equally distant between the two positioned saw blades; and a device configured to align the at least one additional saw blade to the middle position.

According to various embodiments, the at least two intermediate feature-position indicators comprises at least four intermediate feature-position indicators and the detect devices are configured to detecting at least four positions of the at least four feature-position indicators, respectively.

According to various embodiments, the system further comprises saws configured to cut a leading edge and a trailing edge of one or more of the plurality of laminated flooring planks to form one or more planks cut on four sides.

The present teachings can further relate to, as another embodiment, a centering device configured to center the laminated flooring planks cut on four sides to prepare cutting a tongue profile and groove profile on respective edges of the laminated flooring planks. The centering device comprises:

a transporting device configured to transport the laminated flooring planks in a machine direction; and a plurality of a pair of wheels, wherein each wheel of a pair of wheels is in communication with the other wheel of the pair of wheels and each wheel of a pair of wheels is disposed opposite the other wheel of said pair of wheels;

wherein the transporting device that is configured to transport the laminated flooring planks and the plurality of pair of wheels are configured to guide and center the laminated flooring planks in the machine direction.

According to various embodiments, the plurality of a pair of wheels comprises one upstream pair of wheels and at least one downstream pair of wheels with respect to the machine direction, are configured to guide and center the laminated flooring planks in the machine direction. Optionally, a larger distance exists between each wheel of the upstream pair of wheels as compared to the distance between each wheel of the at least one downstream pair of wheels in order to guide and center the laminated flooring planks in the machine direction. Optionally, an initial distance between each wheel of the pair of wheels is smaller than the width of the laminated flooring planks, wherein edges of the laminated flooring planks push out the pair of wheels equal distantly in order to guide and center the laminated flooring planks in the machine direction.

According to an embodiment, the system further comprises a hydraulic system configured to control the position of the plurality of pair of wheels, wherein each wheel of the pair of wheels moves in the opposite direction and equal distance as when the other wheel of the pair of wheels moves. Optionally, the centering is based on the center of a bottom surface that does not have the decorative pattern, of the laminated flooring planks. Optionally, the at least one downstream pair of wheels comprises three pairs of wheels.

In an embodiment, the system comprises saw blades configured to cut a tongue profile and groove profile on the respective edges of the laminated flooring planks.

According to various embodiments, the system further comprises an embossing in register device configured to emboss a texture in register with the decorative pattern on the laminated flooring substrate.

Optionally, the embossing in register device comprises:

a transporting device configured to transport the laminated flooring substrate to a pressing plate;

a plurality of detecting devices, each assigned to a respective indicator, to detect the positions of the indicators; and an aligning device configured to align the pressing plate according to the positions of the detected indicators to emboss a texture in register with the decorative pattern on the laminated flooring substrate.

It is to be understood that both the foregoing general description and the following detailed description are exemplary and explanatory only, and are intended to provide a further explanation of the present invention, as claimed.

All patents, applications, and publications mentioned throughout the application are incorporated in their entirety by reference herein and form a part of the present application.

BRIEF DESCRIPTION OF THE DRAWINGS

The skilled artisan will understand that the drawings, described below, are for illustration purposes only. The drawings are not intended to limit the scope of the present invention in any way.

DESCRIPTION OF VARIOUS EMBODIMENTS

According to various embodiments, the present teachings relate to a process for sub-dividing a laminated flooring substrate which comprises a decorative pattern on a top surface of a core, into a plurality of laminated flooring planks, and a system for doing the same. For example, the present teachings relate to a process for sub-dividing a laminated flooring substrate which comprises an overlay comprising a decorative pattern on a top surface of a core, into a plurality of laminated flooring planks.

The term "substrate" is used interchangeably with "panel" herein. The laminated flooring substrate can be made from any materials known in the art. The laminated flooring substrate can comprise at least a core and a decorative pattern on a top surface of the core. The overlay usually denotes a protective or wear layer, that can be clear once pressure and/or heat is applied. The decorative pattern can be printed on a paper with or without an overlay or additional layers. The decorative pattern serves as a decorative feature of the laminated flooring substrate. Any decorative pattern can be used such as, but is not limited to, designs that simulate stone, ceramic, brick, other natural surfaces, parquet, wood grain, floor tiles with grout lines in between, and any other printed design. The decorative pattern can be printed on paper, the paper can then be coated or saturated with a polymer or resin such as melamine as an overlay, and then applied onto a top surface of the core. The core can be of a variety of materials, such as, but is not limited to, wood (e.g., solid wood, fiber board, plywood, particle board, and the like) or polymeric (e.g., plastic, PVC, thermoplastic, thermoset). The paper can be rolled or placed by any method onto the core and a protective layer can be further applied on top of the paper. Wear resistant particles, such as $Al_2O_3$ can be in one or more of the coatings. As an option, the following is another way to form the laminate. With respect to the laminate on top of the core, a print layer is affixed to the top surface of the core, wherein the print layer has a top surface and a bottom surface. The print layer preferably is an aminoplast resin impregnated printed paper. Preferably, the print layer has a printed design. The printed design can be any design which is capable of being printed onto the print layer. The print layer is also known as a decor print layer. Generally, the print layer can be prepared by rotogravure printing techniques or other printing means such as digital printing. Once the paper has the design printed on it, the paper is then impregnated with an aminoplast resin or mixtures thereof. Preferably the aminoplast resin is a blend of an urea formaldehyde and a melamine formaldehyde. The print paper, also known as the Deco paper, preferably should have the ability to have liquids penetrate the paper such as a melamine liquid penetrating in about 3 to 4 seconds and also maintain a wet strength and even fiber orientation to provide good reinforcement in all directions. The print paper used doesn't need to impregnate with the resin (this is optional), but instead relies on slight resin migration from the adjoining layers during the lamination process (applying heat and/or pressure to laminate all layers to one). Preferably, the resin used for the impregnation is a mixture of urea formaldehyde and melamine formaldehyde resins. Urea formaldehyde can contribute to the cloudiness of the film that is formed and thus is not preferred for dark colors and the melamine resin imparts transparency, high hardness, scratch resistance, chemical resistance, and good formation, but may have high shrinkage values. Combining urea resins with melamine resins in a mixture or using a double impregnation (i.e., applying one resin after another sequentially) provides a positive interaction in controlling shrinkage and reducing cloudiness. Preferably, the type of paper used is 75 $g/m^2$ weight and having a thickness of 0.16 mm. The saturation of the coating preferably is about 64 $g/m^2$. Located optionally on the top surface of the print layer is an overlay. The overlay which can also be known as the wear layer is an overlay paper, which upon being affixed onto the print layer, is clear in appearance. The overlay paper is preferably a high abrasive overlay which preferably has aluminum oxide embedded in the surface of the paper. In addition, the paper is impregnated with an aminoplast resin just as with the print layer. Various commercial grades of high abrasive overlays are preferably used such as those from Mead Specialty Paper with the product numbers TMO 361, 461 (70 $gram/m^2$ premium overlay from Mead), and 561 wherein these products have a range of Taber values of 4000 to 15000. The type of paper preferably used has a weight of about 46 $g/m^2$ and a thickness of about 0.13 mm. With respect to the print layer and the overlay, the amount of aminoplast resin is preferably from about 60 to about 140 $g/m^2$ and more preferably from about 100 to about 120 $g/m^2$. As an option, an underlay can be located and affixed between the bottom surface of the print layer and the top surface of the core. Preferably the underlay is present and is paper impregnated with an aminoplast resin as described above with respect to the print layer and overlay. Preferably, the underlay is Kraft paper impregnated with aminoplast resins or phenolics and more preferably phenolic formaldehyde resin or melamine formaldehyde resin which is present in an amount of from about 60 $g/m^2$ to about 145 $g/m^2$ and more preferably from about 100 $g/m^2$ to about 120 $g/m^2$ paper. The type of paper used is preferably about 145 $g/m^2$ and having a thickness of about 0.25 mm. The underlay is especially preferred when extra impact strength resistance is required. More than one layer of coating or layer of protection can be applied onto a top surface of the core and for a variety of purposes. Additional layers can be formed on the bottom of the core as well, such as a backing layer. A backing layer, for example, can be a melamine coated paper layer or any other desired material. Heat and/or pressure can be used to attach the decorative pattern onto the core. Other known applications in the art can be used to apply the decorative pattern onto a top surface of the core of the laminated flooring substrate.

During the process of making the laminated flooring substrate comprising a decorative pattern, the above-described process or other similar processes can dimensionally change (or can distort) the paper and therefore, dimensionally change (or distort) the decorative pattern. A particular dimensional change, for example, can be, but is not limited to, the linear growth (uniform dimensional change) of the decorative pattern. The linear growth can be either one dimensional or two dimensional. That is, the width of the decorative pattern can increase as compared to the original width of the decorative pattern before it is applied on a top surface of the core, and/or when a paper carrying the decorative pattern is saturated with a resin or other materials such as melamine. The length of the decorative pattern can also increase. Alternatively, both the width and the length can also increase. Besides a linear growth of the decorative pattern, the decorative pattern can also decrease or shrink linearly. Again, the decrease can either be one dimensional or two dimensional, affecting the width and/or the length of the decorative pattern. Another type of dimensional change can be non-linear growth or non-linear decrease/shrinkage of the decorative pattern. In this type of dimensional change, there is a non-uniform dimensional change of the decorative pattern. For example, the sides of the decorative pattern can increase/decrease in width in a different amount compared to the middle portion of the decorative pattern. The locations of dimensional change can be anywhere. Non-linear/non-uniform dimensional change of the decorative pattern can also be one dimensional or two dimensional. According to various embodiments, the system and process described herein can overcome the problems associated with such dimensional change, and can compensate for linear/uniform dimensional change, for non-linear/non-uniform dimensional change, or both.

According to studies in connection to the present teachings, dimensional change of the decorative pattern occurred when the decorative layer is saturated with a resin, such as melamine/melamine formaldehyde. Studies of paper growth by forming grids on the decorative pattern/paper using a coordinate video machine according to the present teachings showed that there tends to be a highest amount of growth on the edges of the decorative pattern/paper. The system and process of cutting the laminated flooring substrate according to the present teachings can accommodate any dimensional change.

According to various embodiments as described below, indicators on a decorative pattern can be used to detect specified positions of a laminated flooring substrate or a laminated flooring plank, and align the substrate or plank. According to one embodiment, the indicators can be used to align the laminated flooring substrate or decorative pattern/paper for an embossing in registration process and using an alignment table to align the laminated flooring substrate with another device such as a press. The pressing plate that has the pattern for embossing (forming indentations or textures on the surface of the decorative pattern and substrate) is aligned so that it matches as close as possible the decorative pattern, for the embossing to be in registered.

In one embodiment, embossing in register can be performed prior to cutting the laminated flooring substrate into a plurality of laminated flooring planks. Motors can move an alignment table located behind the motors. A decorative pattern or the laminated flooring substrate with the decorative pattern can be placed on the alignment table and therefore, can be moved two dimensionally, based on the detection of the indicators on the decorative pattern by the cameras and computers. The alignment table can be adjusted in its position by the computer. The decorative pattern or the laminated flooring substrate can be lined up (in register) to a pressing plate accordingly for the embossing in register process.

In one embodiment, a set of belts can be used to move the laminated flooring substrate on top of the alignment table for the embossing in register process. The set of belts can be positioned on top of the laminated flooring substrate (a second set of belts lays below the bottom of the alignment table).

In one embodiment, six cameras can be used to detect at least three indicators on the laminated flooring substrate for the embossing in register process. In this embodiment, three cameras can be used to detect at least three indicators on each decorative pattern or laminated flooring substrate and to align the laminated flooring substrate for the embossing in register. According to an embodiment, each indicator is positioned at or near each corner of the laminated flooring substrate. Each of the cameras can be positioned to view each of the three corners of a laminated flooring substrate independently and to detect the indicators at each corner.

Each of the cameras can be positioned to view each of the three corners of a laminated flooring substrate independently and to detect the indicators at each corner.

A short belt that can feed the laminated flooring substrate onto an alignment table can be positioned underneath the pressing plate, for the embossing in register process, according to an embodiment.

As described below, devices can be used to align a laminated flooring substrate, such as a controlling unit, such as a computer, detecting devices, indicators on the decorative pattern or laminated flooring substrate, and the like. Such devices and indicators are equally applicable in the process of embossing in register as described above, according to various embodiments.

After the laminated flooring substrate is formed from the above-described process, it is then cut into planks. The planks can be cut to have any desired dimension.

Therefore, one feature of the present teachings is to provide a process and a system for sub-dividing a laminated flooring substrate which comprises a decorative pattern that can be undimensionally changed, dimensional change uniformly/linearly, and/or dimensionally change non-uniformly/non-linearly.

Figure 1:
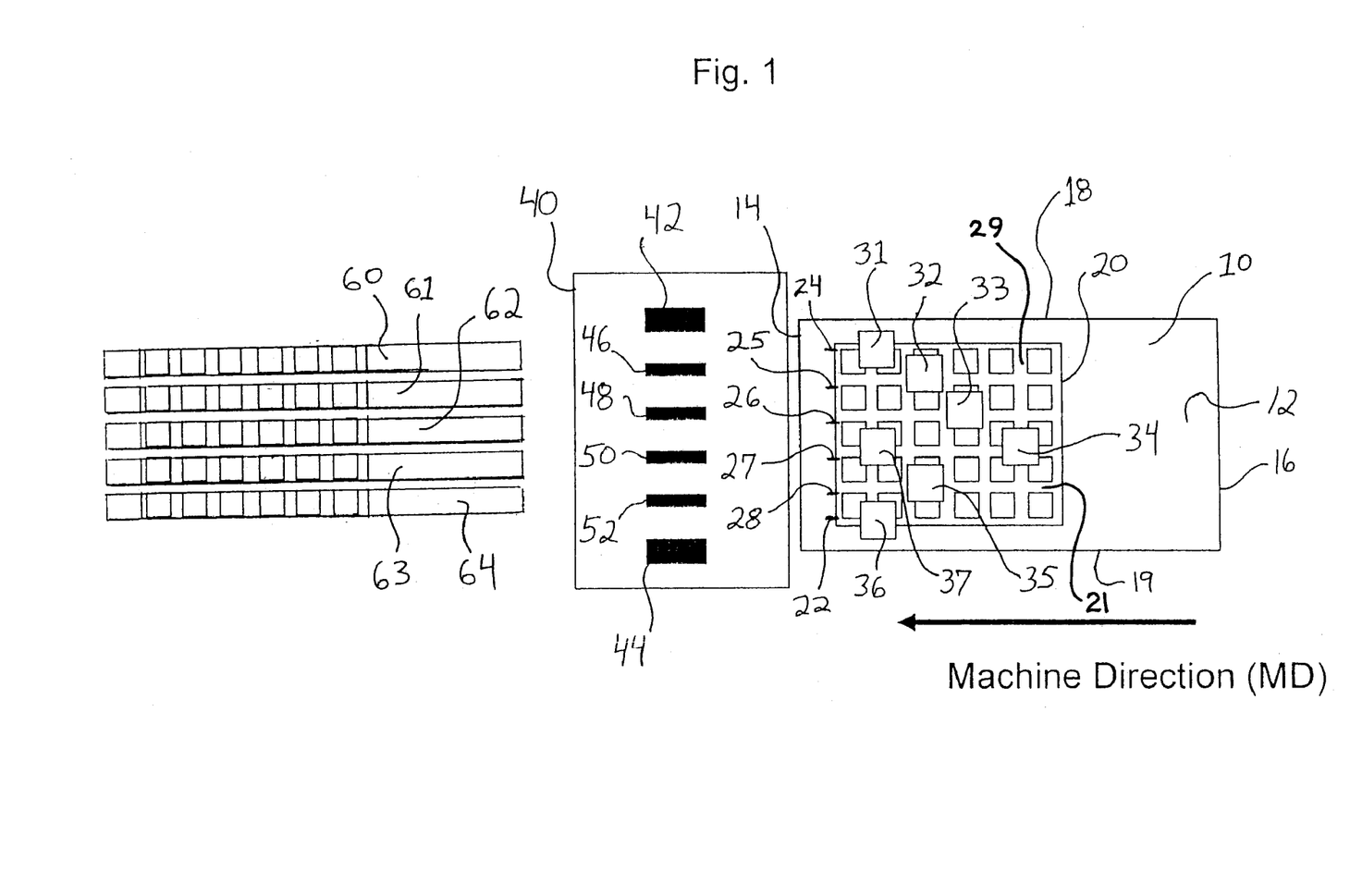
FIG. 1 is a schematic top view of a laminated flooring substrate and the system for sub-dividing the laminated flooring substrate into a plurality of laminated flooring planks, according to various embodiments.

In an embodiment of the present teachings, a process and a system for sub-dividing a laminated flooring substrate are shown in FIG. 1. FIG. 1 shows top view of a system for sub-dividing a laminated flooring substrate 10. The laminated flooring substrate 10 comprises a leading edge 14, a right edge 18, a left edge 19 and a trailing edge 16 on an upper surface 12 of the laminated flooring substrate 10, and can be cut into a plurality of laminated flooring planks 60, 61, 62, 63, and 64. The laminated flooring substrate 10 comprises a decorative pattern 20 on the upper surface 12 of the laminated flooring substrate 10. The decorative pattern 20 is disposed on a top surface of a core (not shown).

As described above, the decorative pattern 20 serves as a decorative feature and therefore, comprises any desired pattern. The decorative pattern 20 can be repetitive in nature such that a plurality of planks 60, 61, 62, 63, and 64 can be distinguished in the decorative pattern by a plurality of features or indicators 22, 24, 25, 26, 27, and 28. Thus, parts of the decorative pattern 20 itself can be used to mark the boundaries or a specific distance from a desired boundary of the individual planks. For example, grout lines within the design of tile flooring can act as indicators. Alternatively, or additionally, other markers separate from such design features can be placed on the boundaries of the decorative pattern (and/or elsewhere) and act as the indicators (the term "indicators" is used interchangeably with the term "markers" or "marks" herein). In other words, parts of the decorative pattern 20 can be indicators or separate indicators can be placed on the upper surface 12 of the laminated flooring substrate 10. The decorative pattern can include indicators (also called registration marks) for the embossing in register process, according to various embodiments. The indicators can also be used for aligning the laminated flooring substrate or the laminated flooring planks to any of the saws. An out-feed belt behind a press that comprises a pressing plate can be used to transport the laminated flooring substrate after embossing in register, according to various embodiments. A layout belt can be used to transport the laminated flooring substrate into the press that comprises a pressing plate, before the embossing in register process, according to an embodiment.

Indicators can also be under the upper surface of the laminated flooring substrate, on or near the bottom surface, and/or embedded within the laminated flooring substrate. Indicators can be detected in other ways instead of by visual inspection. Examples of indicators include, but are not limited to, lines, dots, symbols, and any mark or any devices used to pinpoint a position on the decorative pattern or the laminated flooring substrate. Radio frequency identifiers can be used for positioning with an appropriate detection system, for example, a non-optical detection system.

In one embodiment, a laminated flooring substrate with a decorative pattern comprises 12 inch tiles and indicators, according to an embodiment. In this embodiment, omits can be used as indicators (markers) which can comprise a line in the middle of the grout line. The omits are deletions of part of a pattern. A solid line can be used as an indicator for aligning rip saws to cut the laminated flooring substrate into planks. Different indicators can be positioned on the grout lines between the tiles, according to various embodiments. The different indicators can comprise a solid line or a dashed line, according to various embodiments. The different indicators can be on or near the grout lines, according to various embodiments. One indicator comprises a solid line and another indicator comprises a black cross mark. The indicator can comprise a black cross mark. In an embodiment, this indicator can be used for the alignment of the laminated flooring substrate for the embossing in register process. This indicator can also be used for straight-square alignment of a laminated flooring substrate, for alignment of the laminated flooring substrate to the rip saws to cut the laminated flooring substrate into planks, or for alignment of the laminated flooring substrate to the cross saws to cut the planks into smaller planks. The omits or any indicators can at least be removed during a laminated flooring substrate or plank cutting procedure. The cutting procedure can result in a plurality of planks uncut leading and trailing edges or can result in a plurality of planks with pre-cut leading and trailing edges. The planks can then be finished, for example, to form planks cut on four sides, which are ready to be profiled. The solid line omit/indicator can be slightly off-set from the center-line of the grout area. Therefore, the planks can be cut such that a left side of each plank can be provided with a wider resulting grout line compared to the right side of each plank. These different widths can be useful in profiling so as to enable a formation of tongue and groove sides having grout lines of the same width after profiling. For example, the left side can be profiled to provide a tongue, and the narrower resulting grout line appearing on the top surface after profiling can be the same width as the grout line on the right side of the plank. Two small omit squares that can be used as indicators for aligning cross saws, according to an embodiment. The cross saws can be used to cut the planks into shorter planks.

A suction cup can be used to move the laminated flooring substrate for a straight-square alignment with respect to the rip saws, according to various embodiments.

In FIG. 1, an embodiment is shown wherein the indicator comprises a grout line (21, 29) (or other textural appearing landmark in the pattern), for example, a centerline of a grout line. One or more opposing edge(s) of one or more grout lines in a design including grout lines, can be used as indicators. The two opposing edges of two opposing tiles can be used as an indicator and a determination can be made as to where the middle of the grout line lies. According to various embodiments, a saw can be lined-up with the middle (or close to the middle in order to compensate for forming tongue and groove profiles) of the grout line.

In one embodiment of the present teachings, the decorative pattern 20 can comprise a plurality of indicators 22, 24, 25, 26, 27, and 28, including at least a left side indicator 22, a right side indicator 24, and at least two intermediate feature-position indicators 25, 26, 27, and 28, between the left side indicator 22 and the right side indicator 24. Additional numbers of side and/or feature-position indicators can be used as desired.

A transporting device can be provided with which the laminated flooring substrate 10 can be conveyed in a machine direction MD toward a cutting unit 40 that can cut the laminated flooring substrate 10 into individual planks 60, 61, 62, 63, and 64. The transporting device can comprise any transporting device available in the art such as those that comprise rollers, a conveyor belt, drive units, control units, tracks, rails, and the like features, and combinations thereof. The cutting unit 40 can be positioned to cut the laminated flooring substrate 10 and can comprise any saw available in the art and known for such purpose, for example, circular table saws, laser saws, and the like devices. For example, the cutting unit 40 shown comprises a plurality of saw blades 42, 44, 46, 48, 50, and 52. For example, as shown in FIG. 1, the cutting unit 40 can comprise end saw blades 42 and 44, and center saw blades 46, 48, 50, and 52. The end saw blades 42 and 44, can be thicker than the center saw blades 46, 48, 50, and 52, such as a hogger saw blade as are known in the art. The end saw blades can be designed to eliminate entire margins or boundary portions that fall outside the desired design of the finished products, for example, so that scrap strips do not result from cutting the end planks 60 and 64.

The number of saw blades that can be used in the cutting unit 40 can be based on the number of planks to be cut from the flooring substrate 10, the number of indicators provided on the laminated flooring substrate, or a combination thereof. The cutting unit 40 can be adjustable such that the number and the positions of the saw blades 42, 44, 46, 48, 50, and 52 can be adjusted.

Also shown in FIG. 1 are detecting devices 31, 32, 33, 35, 36 and 37, that detect the indicators 22, 24, 25, 26, 27, and 28. Each detecting device is assigned to one of the indicators in the embodiment shown although other combinations can be made. Each detecting device can individually and independently obtain the position of a respective one of the indicators 22, 24, 25, 26, 27, and 28. In an embodiment, the plurality of detecting devices comprises a plurality of cameras. However, other detecting devices known in the art can be used such as charge couple devices, charge-induced devices, infrared detectors, ultraviolet light detectors, and the like. In an embodiment, a total of six detecting devices 31, 32, 33, 35, 36 and 37 or six cameras are used to detect six indicators 22, 24, 25, 26, 27, and 28, such as shown in FIG. 1. In one embodiment, seven cameras can be used to read information such as the positions of the indicators on the laminated flooring substrate. Any number of detectors or cameras can be used preferably with a corresponding number of indicators. In an embodiment, the cameras use red light as they detect the indicators because the red light provides the best contrast of the decorative patterns. Dust protectors can be used to cover the cameras from their peripheries since saw dust particles resulting from the sawing process can interfere with the detecting process.

The plurality of detecting devices 31, 32, 33, 35, 36 and 37, can be suspended on top of the decorative pattern 20 and detect the indicators 22, 24, 25, 26, 27, and 28. For example, if the plurality of detecting devices 31, 32, 33, 35, 36 and 37 comprise a plurality of cameras, the cameras can take respective pictures of various points or lines within the decorative pattern 20 or corresponding to some other indicator. Collectively, the cameras can examine the decorative pattern 20 and detect the positions of the plurality of indicators 22, 24, 25, 26, 27, and 28. Each detecting device can determine the position of each indicator individually and independently. Optionally, part of the detecting device can be a computer (not shown) which can store information related to a design pattern and can make adjustments to the positioning of the cameras in preparation for detecting the indicators.

Each saw blade is positionable with a respective aligning device. Each aligning device (not shown) can align a separate saw blade to a desired position as instructed by a control system (or aligning the laminated flooring substrate to a separate saw). For example, the aligning devices can align the plurality of saws relative to the laminated flooring substrate 10 shown in FIG. 1 such that the saws collectively form the products shown as 60, 61, 62, 63, and 64. In one embodiment, the aligning device comprises suction cups attached to the laminated flooring substrate that are in communication with a controller such as a computer and the detecting devices. The detecting devices first obtain a picture of part of the decorative pattern where a respective indicator is positioned. This data can be communicated via an electronic signal to a controller such as a computer which recognizes the indicator, determines the position of the indicator in relation to the decorative pattern, and optionally based on stored coordinates in the computer, adjusts or aligns the laminate flooring substrate accordingly either for a straight-square alignment or alignment to the saws. In this embodiment, the suction cups can be used to attach to the decorative pattern/laminated flooring substrate, and can be moved by motors, gears or the like devices. In an embodiment, two suction cups are attached to the laminated flooring substrate. Therefore, a computer with the proper programming or software along with the detecting devices can align the laminated flooring substrate to the saws accordingly.

The aligning devices can align the respective saws with the respective positions of the detected side indicators and feature-position indicators (or vice versa) to cut the laminated flooring substrate 10 along the indicators 22, 24, 25, 26, 27, and 28. This aligning device can either be part of the detecting devices 31, 32, 33, 35, 36 and 37, a part of the cutting unit 40, a part of the transport device, or completely separate but is at least in communication with the detecting devices 31, 32, 33, 35, 36 and 37, the cutting unit 40 and/or the transport device. Any aligning device known in the art can be used to move the saw blades to a desired position with respect to the laminated flooring substrate 10 and its side and feature-position indicators 22, 24, 25, 26, 27, and 28 and communicate with the detecting devices 31, 32, 33, 35, 36 and 37, the cutting unit 40 and/or the transport device. For example, an aligning device or a part thereof can be a programmed computer with appropriate software (not shown) configured to correlate the position of the individual indicators 22, 24, 25, 26, 27, and 28 with the position of the individual saw blades 42, 44, 46, 48, 50, and 52 and make any adjustments or calculations necessary, such as movement of the individual saw blades 42, 44, 46, 48, 50, and 52, movement of the transport device, movement of the laminated flooring substrate 10, or combinations thereof. In an embodiment, the alignment can be performed by movement of the laminated flooring substrate via the above described suction cups. Each movement or adjustment can be independent of another movement or adjustment. For example, servo-motors can be used to move and align the saws, or a hydraulic robotic movement system can be used.

Any suitable control unit can be used to control the system. The control unit can, for example, be configured to receive signals from the cameras and to process those signals into one or more coordinates that is then used by an aligning device to align one or more of the saws appropriately. Exemplary systems and control configurations are described, for example, in U.S. Pat. No. 6,569,272 B2, issued May 27, 2003, which is incorporated herein in its entirety by reference.

In another embodiment, the system comprises at least one additional detecting device 34 that is positioned upstream from one of the detecting devices 31, 32, 33, 35, 36 and 37 with respect to the machine direction MD in order to detect a straight-square alignment of the laminated flooring substrate 10. A straight-square alignment means that the laminated flooring substrate 10 is properly straight and aligned in the machine direction MD for a straight and proper cutting. The additional detecting device 34 can also comprise a camera and can detect the straight-square alignment of the laminated flooring substrate 10 in a similar fashion as the cameras of the detecting devices 31, 32, 33, 35, 36 and 37 previously described. In an embodiment, the additional detecting device 34 detects an indicator, and compares the position of the detected indicator with the position of another indicator that is detected by the plurality of detecting devices 31, 32, 33, 35, 36 and 37 in order to determine if the laminated flooring substrate is straight-square with the cutting unit 40. The additional detecting device 34 allows for the aligning of the laminated flooring substrate 10 to be straight-square prior to cutting by using an aligning device (not shown) that can be separate or part of additional detecting device 34, the cutting unit 40 and/or the transport device. An example of the straight-square alignment is performed by using the two suction cups previously described to move the laminated flooring substrate after communication of various devices as described above. In an embodiment as depicted in FIG. 1, the aligning device is the transporting device itself. In other words, a signal is sent to the transport device whether or not the laminated flooring substrate is straight-square and the transport device makes any necessary adjustment to the direction of the transporting of the laminated flooring substrate so that it is straight-square with the cutting unit 40. One example of such adjustment is a shifting of a conveyor belt if the conveyor belt is used as a transporting device. In another embodiment, the alignment can be accomplished by movement of the laminated flooring substrate as described above.

Any devices known in the art can be used to align the laminated flooring substrate 10 to be straight-square prior to cutting. Exemplary devices include, but are not limited to, wheels and a hydraulic system as described below, or simply devices to control the position of the transporting devices 31, 32, 33, 35, 36 and 37, the laminated flooring substrate 10, and/or the cutting unit 40, such as a computer as mentioned above. As with the detecting devices 31, 32, 33, 35, 36 and 37, the additional detecting device 34 can be in communication with a separate device such as a computer which stores pertinent information and allows controlling of the alignment of the laminated flooring substrate 10 to be straight-square prior to cutting.

In an embodiment, the process and system according to the present teachings comprises a control unit comprising three computers with appropriate software/programs. A first computer can control all of the movements of the saws (rip saws for cutting of the laminated flooring substrate in the direction of the machine direction/grain direction, and/or cross saws for cutting the laminated flooring planks perpendicular to the grain direction into smaller planks), the laminated flooring substrate, the laminated flooring planks, the transport devices, and/or the aligning devices, etc., based on information obtained from the detecting devices (e.g., cameras). A second computer can control more specifically the rip saws for cutting the laminated flooring substrate based on information obtained from the seven detecting devices (e.g., seven cameras). A third computer can control more specifically the cross saws for cutting the laminated flooring planks into smaller planks based on information obtained from three detecting devices (e.g., three cameras). The detection of indicators and control of individual devices, saws, etc., are based on the same concepts as described above and below for both cutting the laminated flooring substrate into planks and cutting the planks into smaller planks. Each of the programs or software for each of the computers can be designed or written to carry out instructions such as movements of devices and/or calculations necessary as described above and herein.

After the laminated flooring substrate is cut into planks, the planks can then be cut into smaller planks using cross saws. In an embodiment, the planks are cut by using a detection mechanism similar to that described for the cutting of the substrate, and uses three cameras and three cross saws instead.

In an embodiment, the position of a center saw of the three cross saws remains the same while two end saws can be repositioned by one of the computers when cutting the planks into smaller planks. In the process of cutting the planks into smaller planks, additional indicators such as those described for the substrate can be used to align the planks with the cross saws. After cutting the substrate and in preparation of the cutting of the planks into smaller planks, additional devices can be used, such as dog chains to catch the planks and square them for the cross cutting, and a pusher fence to move the planks to where the cross saws are located. A pusher fence comprising a motor, a gear box and couplings, according to an embodiment can be used. The pusher fence can be used to align the planks with respect to the cross saws after the indicators are detected, to cut the planks into smaller planks. Three cameras can be used to detect indicators useful to align the planks with the cross saws, according to various embodiments. Once aligned, the planks can then be cut into smaller planks. Therefore, dog chains and/or a pusher fence can be used for alignment of the planks with the cross saw blades based on the detecting of indicators on the planks. With the help of the detecting devices/cameras as described above, the computer selects a saw and moves it accordingly. The computer can be programmed to allow a margin of error as to the positioning of the saw blades to the positions of the indicators. In other words, the computer can be programmed to allow an acceptable deviation of the aligning of the indicators with the saw blades for both cutting the laminated flooring substrate and the planks.

In another embodiment, the process and system can further comprise providing at least one additional saw blade (not shown) that is located between two saw blades that are positioned by respective detecting devices; determining a distance between the two positioned saw blades and positioning the at least one additional saw blade equal distance between the two positioned saw blades; and cutting the laminated flooring substrate 10 with the positioned saw blades and the at least one additional saw blade. The at least one additional saw blade can be simply one blade, two blades, three blades, or any desired number of blades, depending on the number of panels that is desired. In other words, the at least one additional saw blade does not have to be positioned directly based on the detected indicators. The controlling of the desired position of the at least one additional saw blade and the determining of the distance between two additional saw blades can be by any device such as a computer, a transport device, the cutting unit 40, the detecting devices 31, 32, 33, 35, 36 and 37 and/or an aligning device as described above. The additional saw blade can be separate from the cutting unit 40 or part of the cutting unit 40.

Therefore, for the process of sub-dividing a laminated flooring substrate 10 according to the above-described process, a system for such is also provided wherein each part of the system is configured to carry out the functions as described. Thus, the system can comprise:

a transporting device configured to transport in a machine direction MD the laminated flooring substrate;

a plurality of detecting devices, each detecting device assigned to a respective indicator in order to obtain the positions of the detected indicators, wherein the indicators comprise at least a left side indicator, a right side indicator, and at least two intermediate feature-position indicators;

a plurality of saw blades, each with a respective position of a respective one of the detected indicators and configured to cut the laminated flooring substrate; and an aligning device configured to align a separate saw blade per each position of the detected indicator to cut the laminated flooring substrate along the indicators.

Optionally, the system can further comprise:

at least one additional detecting device that is positioned upstream from one of the detecting devices with respect to the machine direction and is configured to detect a straight-square alignment of the laminated flooring substrate; and a device configured to align the laminated flooring substrate to be straight-square prior to the cutting.

In another embodiment, the system can further comprise:

at least one additional saw blade located between two saw blades that are positioned by respective detecting devices;

a device configured to determine a distance between the two positioned saw blades and to determine a middle position equally distant between the two positioned saw blades; and a device configured to align the at least one additional saw blade to the middle position.

In various embodiments, the system comprises devices configured to carry out the steps described above.

Figure 2:
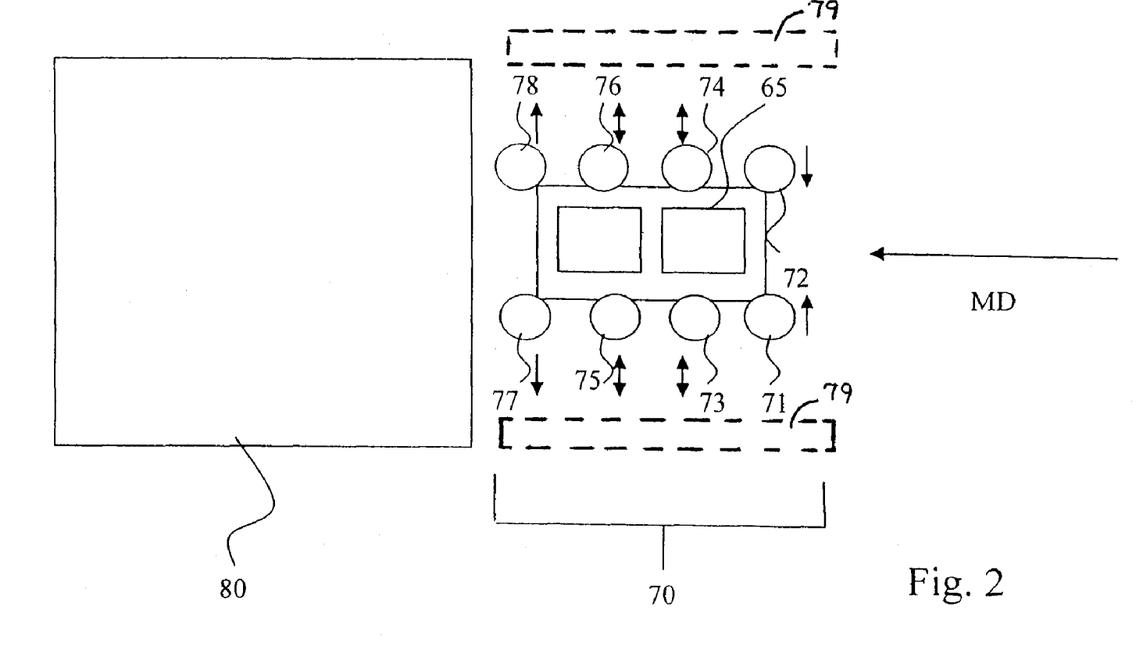
FIG. 2 is a schematic top view of a device for guiding and centering the laminated flooring planks in preparation for cutting a tongue profile and a groove profile on respective side edges of the laminated flooring planks, according to various embodiments.

In another embodiment, the present teachings further relate to a process and system for centering the laminated flooring planks by a centering device to prepare cutting a tongue profile and groove profile on respective edges of the laminated flooring planks. Once the laminated flooring substrate is cut into a plurality of flooring substrate planks as shown in the process or system depicted in FIG. 1 and also cut into smaller planks as described above, the individual flooring planks can be prepared to be centered by a centering device as shown in FIG. 2 in preparation for cutting a tongue profile and a groove, profile. Before cutting the groove profile and tongue profile, however, the laminated flooring planks can be treated by any processes subsequent to cutting the laminated flooring planks from the laminated flooring substrate. One example of such processes comprises, but is not limited to, placing the laminated flooring panels into a humidifier, or storing it in a controlled environment. The short ends, that is, the leading edge and the trailing edge of each resulting planks 60, 61, 62, 63, and 64 can be cut by the same or a similar system as used to form the resulting planks. The planks cut on four sides (shown as 65 in FIG. 2) can then be profiled.

According to various embodiments, the process of centering the laminated flooring plank 65 can be accomplished by providing a transporting device (not shown) as part of the centering device to transport the laminated flooring plank 65 in a machine direction MD towards a profiling machine 80 that is used to cut a tongue profile and groove profile on the respective edges of the laminated flooring plank 65. The profiling machine 80 can be any machine that is known in the art to create the tongue or groove profile, such as a double-end tenoner. The transporting device of the centering device allows transport of the individually cut laminated flooring plank 65. As with the device that transport the laminated flooring substrate for FIG. 1, the transport device for the panels can be any device known in the art such as, but not limited to, rollers or a conveyer belt. The centering device can also be automated and controlled by a computer as described above.

Shown in FIG. 2 is a plurality of a pairs of wheels 70 included in the centering device, wherein each wheel of a pair of wheels rotate around its own axis of rotation and is in communication with the other wheel of the pair of wheels and each wheel of a pair of wheels is disposed opposite the other wheel of the pair of wheels. Together, the plurality of a pair of wheels 70 and the transporting device help to guide and center the laminated flooring plank 65 in the machine direction MD. In some embodiments, as one wheel of each pair moves outwardly or inwardly away from or toward the other wheel of the pair, the relative movement of the two wheels is identical but opposite such that each maintains the same distance as the other from the centerline between the two wheels. In one embodiment, a centering device for the laminated flooring planks comprises four groups of hydraulic shocks each group being tied together and guiding the planks to ride down the center of the device.

The process of centering the laminated flooring planks comprises providing one upstream pair of wheels 71, 72 and at least one downstream pair of wheels 73, 74, 75, 76, 77, 78 with respect to the machine direction MD as part of the plurality of pair of wheels 70 in order to guide and center the laminated flooring plank 65 in the machine direction MD. Shown in FIG. 2 is an embodiment wherein the at least one downstream pair of wheels 73, 74, 75, 76, 77, 78 comprises three pairs of wheels. However, any number of the pair of wheels can be used for either the upstream pair of wheels 71, 72 or the at least one downstream pair of wheels 73, 74, 75, 76, 77, 78. In other words, the upstream pair of wheels can comprise more than one pair of wheels and the at least one downstream pair of wheels can comprise more than two pairs of wheels or more than three pairs of wheels.

In an embodiment, the process of centering the laminated flooring planks comprises providing a larger distance between each wheel of the upstream pair of wheels 71, 72 as compared to the distance between each wheel of the at least one downstream pair of wheels 73, 74, 75, 76, 77, 78 as shown in FIG. 2. This difference in distance between the pair of wheels assists the guiding and centering of the laminated flooring plank 65 in the machine direction MD. According to an embodiment, the laminated flooring plank 65 is sized to fit between wheels 77 and 71 (or 78 and 72) to facilitate the centering process. Alternatively, the distance between wheels 77 and 71 (or 78 and 72) are configured to be at least longer than the length of plank 65.

Furthermore, as shown in FIG. 2, the process of centering the laminated flooring plank 65 comprises providing an initial distance between each wheel of the plurality of pair of wheels 70 that is smaller than the width of the laminated flooring plank 65 wherein edges of the laminated flooring plank 65 push out the pair of wheels equal distantly. This also assists in guiding and centering the laminated flooring plank 65 in the machine direction MD.

In one embodiment of the invention, a hydraulic system (79) is provided to control the position of the plurality of pair of wheels 70, wherein each wheel of a pair of wheels moves in the opposite direction and equal distance as when the other wheel of the pair of wheels moves. Other methods of controlling the moving direction and distance between each pair of wheels can be used.

Based on the configuration of the centering device according to various embodiments described above and herein, the centering device of the present invention does not require the use of a fence which is normally used in cutting a tongue profile and a groove profile of planks having only a predetermined width. The centering device according to the present teachings allows for tongue and groove profiling based on the center of the planks and evenly on all four sides of the planks, and accepts planks having different widths.

Figures 3, 5:
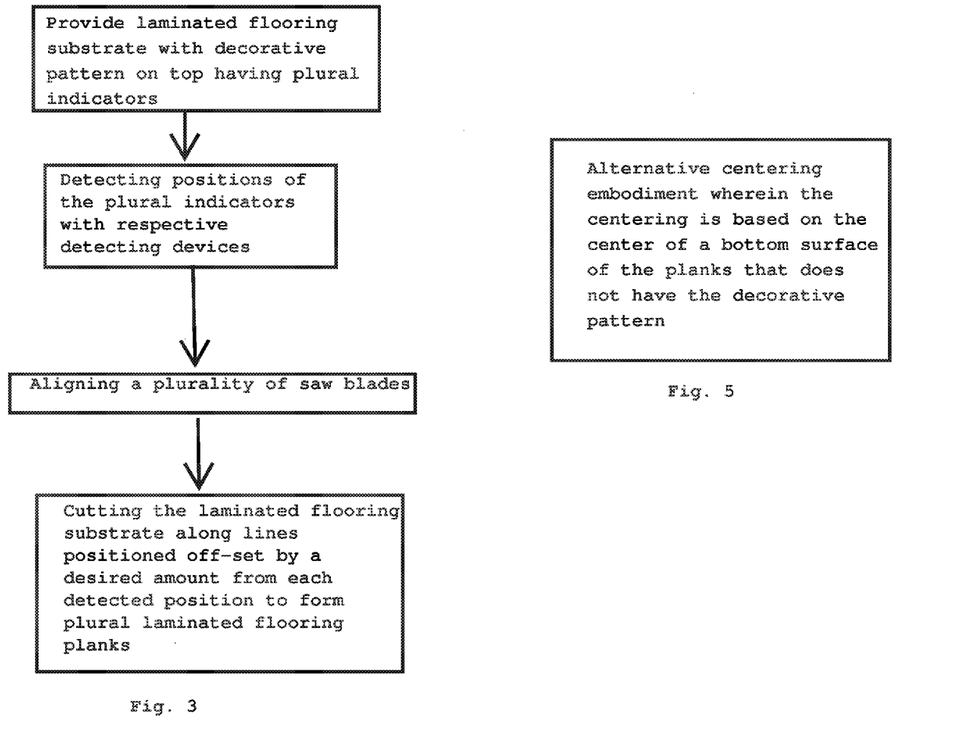
FIG. 3 schematically shows an alternative embodiment wherein the laminated flooring substrate is cut along lines that are off-set by a desired amount from each detected position.
FIG. 5 schematically shows an alternative embodiment wherein the centering is based on the center of a bottom surface of the plank that does not have the decorative pattern.
Figure 4:
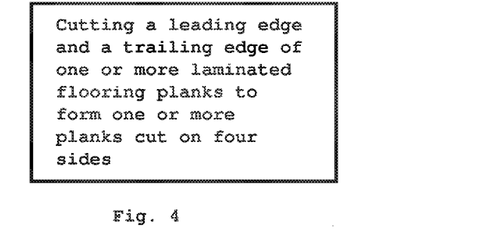
FIG. 4 schematically shows the step of cutting the leading and trailing edges of one or more of the plurality of laminated flooring planks to form one or more planks cut on four sides.

Optionally, in the process of centering the laminated flooring plank 65, the centering is based on the center of bottom surface that does not have a decorative pattern, of the laminated flooring plank 65. A profile machine 80 is configured to cut the tongue profile and the groove profile on the laminated flooring plank 65, based on the centering of the bottom surface of the laminated flooring plank 65. The laminated flooring plank cut on four sides can be placed upside down so that the bottom surface of the plank is on top and is then sent to the centering device.

Therefore, although FIG. 2 shows centering of a plank with the decorative pattern on top, another embodiment comprises centering the plank with the decorative pattern on the bottom. An automated device such as a stacking belt can be used to place the planks with the decorative pattern on the bottom and send them to the centering device. For illustration purposes, FIG. 2 shows the centering of a plank with the decorative pattern on the top in order to show that the decorative pattern can be slightly off-set for cutting a tongue profile and a groove profile on the respective side edges. As shown in FIG. 2, the grout line on one side of the edges is slightly wider than the grout on the other side. This allows for proper cutting of the tongue profile and the groove profile. The plank is, however, still centered. Each of the wheels can rotate around an axis of rotation and can move in two directions, either towards the center of the plank or away from the center of the plank in order to center the plank. In an embodiment, once both the leading edge and the trailing edges of the planks are between wheels 78 and 72 or between wheels 77 and 71, the plank is free flowing (no pressure is required to center or move the plank as opposed to when the plank is not completely between these wheels) and is completely centered.

Thus, as for the process of centering the laminated flooring plank 65 to prepare cutting a tongue profile and groove profile on respective edges of the laminated flooring plank 65 as described above, a system for centering the laminated flooring plank 65 is also provided. The centering device therefore can comprise:

a transporting device configured to transport the laminated flooring plank in a machine direction; and a plurality of a pair of wheels, wherein each wheel of a pair of wheels is in communication with the other wheel of the pair of wheels and each wheel of a pair of wheels is disposed opposite the other wheel of the pair of wheels;

wherein the transporting device that is configured to transport the laminated flooring plank and the plurality of pair of wheels, are configured to guide and center the laminated flooring plank in the machine direction.

Preferably, the centering device comprises devices configured to carry out the functions as described above.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A process for sub-dividing a laminated flooring substrate into a plurality of laminated flooring planks, the process comprising:
   providing the laminated flooring substrate, the laminated flooring substrate comprising a decorative pattern, the decorative pattern including simulated textural landmarks, on a top surface of a core, wherein the simulated textural landmarks of the decorative pattern comprise a plurality of indicators, comprising at least a left side indicator, a right side indicator, and at least two intermediate feature-position indicators between the left side indicator and the right side indicator;
   detecting the positions of the plurality of indicators with a plurality of detecting devices, each detecting device assigned to a respective indicator;
   aligning a plurality of saw blades, each with a respective one of the detected positions; and
   cutting the laminated flooring substrate along lines positioned at or off-set by a desired amount from each detected position by feeding the laminated flooring substrate in a machine direction towards the saw blades, to form the plurality of laminated flooring planks, wherein left and right are with respect to lateral sides of the machine direction.

2. The process of claim 1, wherein the cutting comprises cutting the laminated flooring substrate along lines centered with each detected position, to form the plurality of laminated flooring planks.

3. The process of claim 1, wherein the cutting comprises cutting the laminated flooring substrate along lines off-set from the centers of each detected position, to form a plurality of laminated flooring planks.

4. The process of claim 1, wherein the plurality of detecting devices comprises a plurality of cameras.

5. The process of claim 4, wherein the plurality of indicators comprises at least four feature-position indicators, and the detecting comprises detecting each indicator with a separate respective one of the plurality of cameras.

6. The process of claim 1, further comprising:
   providing at least one additional detecting device that is positioned upstream from the plurality of detecting devices with respect to the machine direction to detect a straight-square alignment of the laminated flooring substrate; and
   aligning the laminated flooring substrate to be straight-square in alignment with the machine direction prior to the cutting.

7. The process of claim 1, wherein the at least two intermediate feature-position indicators comprises at least four intermediate feature-position indicators and the detecting comprises detecting at least four positions of the at least four feature-position indicators, respectively.

8. The process of claim 1, further comprising cutting a leading edge and a trailing edge of one or more of the plurality of laminated flooring planks to form one or more planks cut on four sides.

9. The process of claim 8, further comprising centering, with respect to the machine direction, one or more of the one or more planks cut on four sides and profiling at least one tongue on one of the four cut sides and at least one groove on at least one opposite side.

10. The process of claim 9, further comprising:
    providing one upstream pair of wheels and at least one downstream pair of wheels with respect to the machine direction as part of a plurality of pairs of wheels in order to guide and center one of the one or more planks cut on four sides in the machine direction.

11. The process of claim 10, further comprising:
    providing a larger distance between each wheel of the upstream pair of wheels as compared to the distance between each wheel of the at least one downstream pair of wheels in order to guide and center one or more planks in the machine direction.

12. The process of claim 10, further comprising:
    providing an initial distance between each wheel of the pairs of wheels that is smaller than the width of the laminated flooring planks, wherein edges of one or more planks push out the pairs of wheels equal distantly in order to guide and center the planks in the machine direction.

13. The process of claim 10, further comprising:
    providing a hydraulic system to control the position of the plurality of pairs of wheels, wherein each wheel of a pair of wheels moves in the opposite direction and equal distance as when the other wheel of the respective pair of wheels moves.

14. The process of claim 10, wherein the centering is based on the center of a bottom surface that does not have the decorative pattern, of the one or more planks.

15. The process of claim 1, wherein the decorative pattern comprises simulated tiles and grout lines, wherein the simulated textural landmarks comprise the simulated grout lines, and wherein the indicators each comprise one of the grout lines.

16. The process of claim 15, wherein the detecting comprises detecting a centerline of the respective grout line with the respective detecting device which is assigned to that grout line.

17. The process of claim 1, wherein the decorative pattern comprises simulated tiles and grout lines, wherein the simulated textural landmarks comprise the simulated grout lines, and wherein the indicators each comprise a centerline of the grout lines.

* * * * *